March 27, 1951        G. DEARSLEY        2,546,727
TOBACCO CUTTING MACHINE

Filed Aug. 1, 1947        7 Sheets-Sheet 1

Inventor
George Dearsley
By Watson, Cole, Grindle & Watson

March 27, 1951  G. DEARSLEY  2,546,727
TOBACCO CUTTING MACHINE
Filed Aug. 1, 1947  7 Sheets-Sheet 3
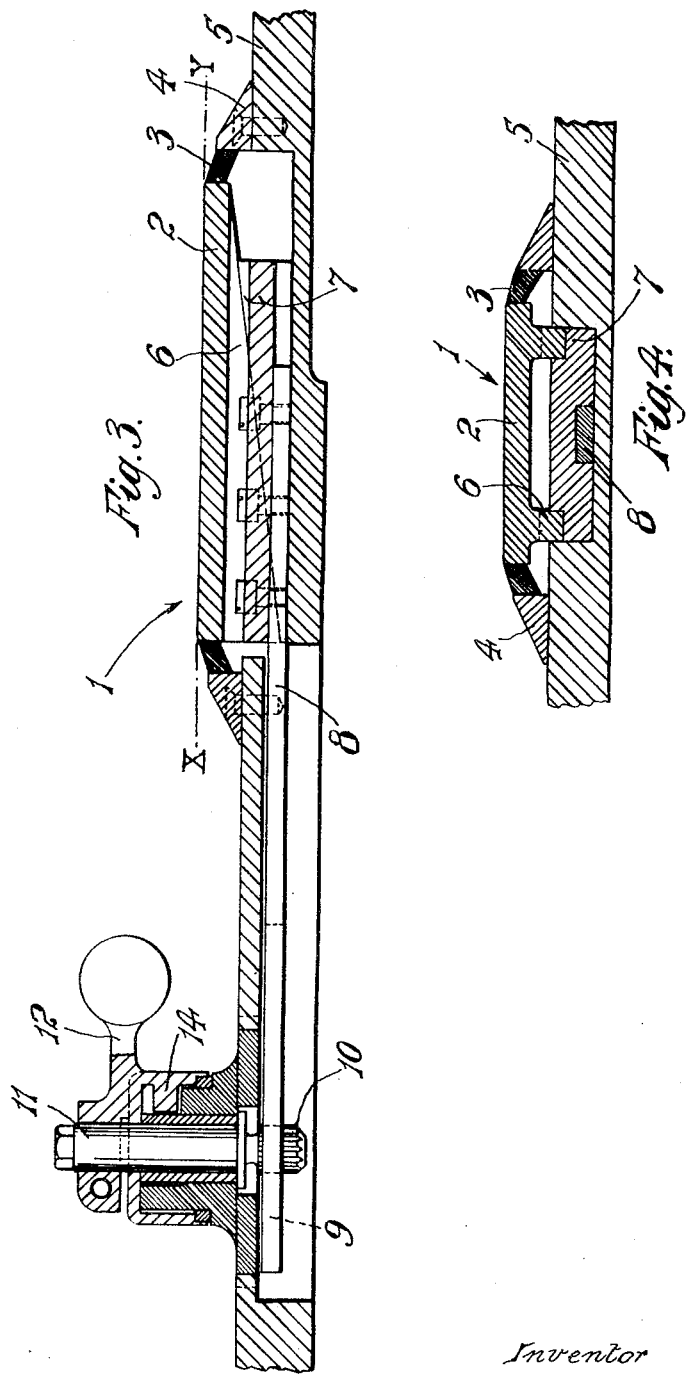
Inventor
George Dearsley
By Watson, Cole, Grindle & Watson March 27, 1951  G. DEARSLEY  2,546,727
TOBACCO CUTTING MACHINE
Filed Aug. 1, 1947  7 Sheets-Sheet 4
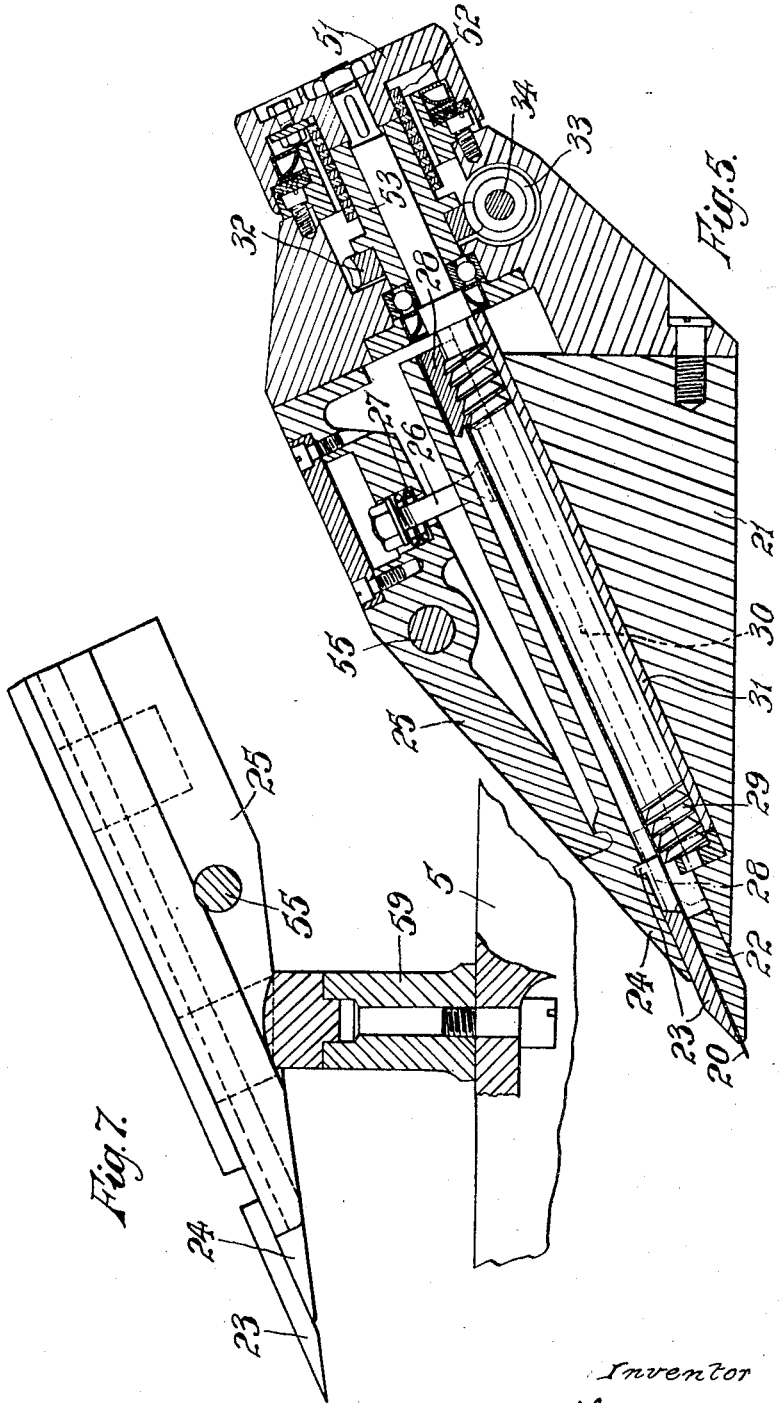
Inventor
George Dearsley
By Watson, Cole, Grindle & Watson

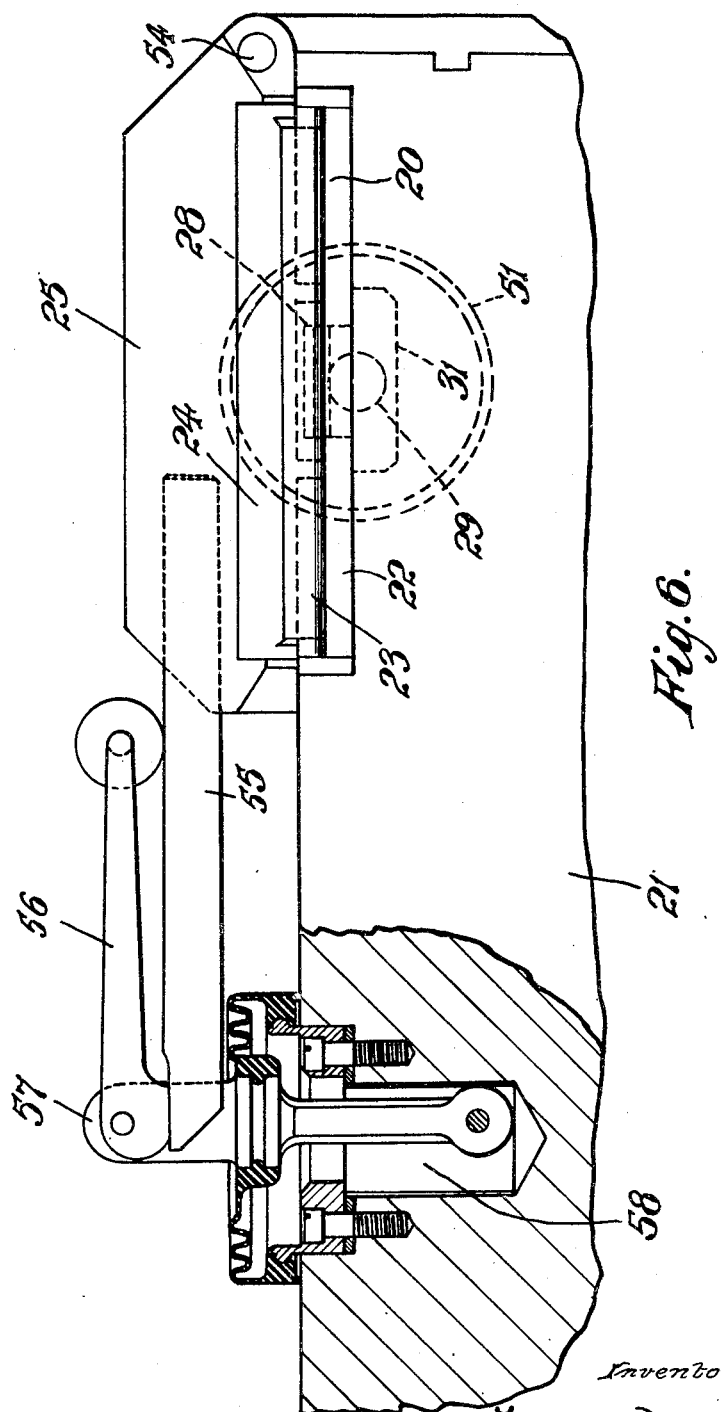

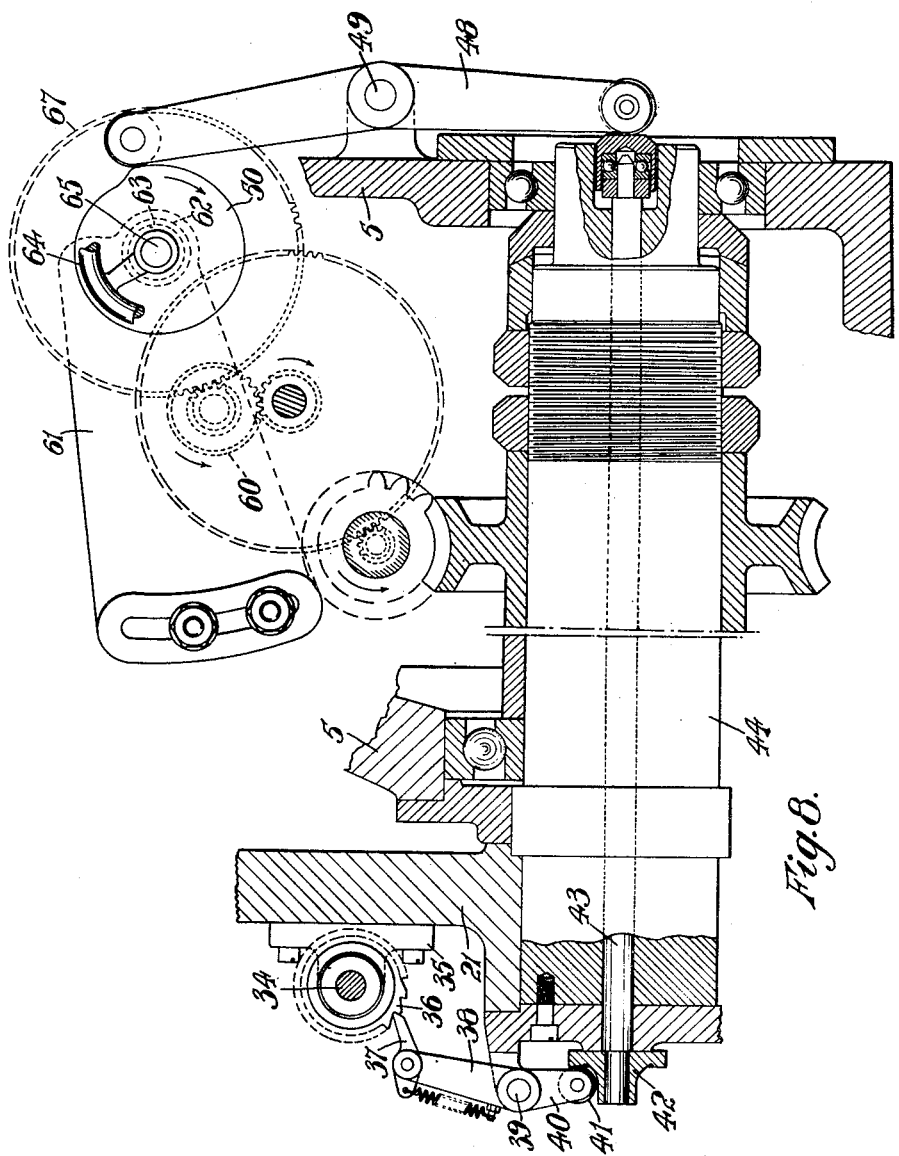

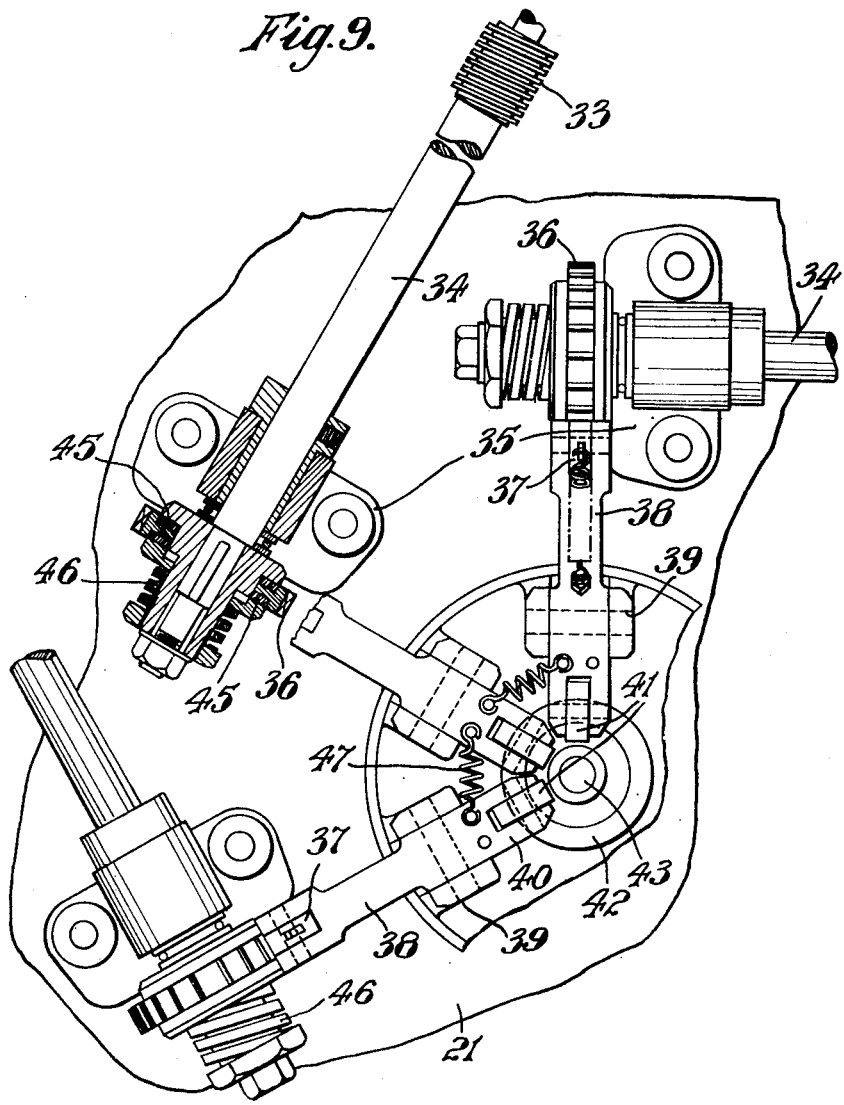

Patented Mar. 27, 1951

2,546,727

UNITED STATES PATENT OFFICE 2,546,727

TOBACCO CUTTING MACHINE

George Dearsley, London, England, assignor to Molins Machine Company Limited, London, England, a British company Application August 1, 1947, Serial No. 765,392
In Great Britain August 7, 1946

3 Claims. (Cl. 146—108)

This invention concerns improvements in or relating to tobacco cutting machines and refers more particularly to machines of the kind having a rotatable head furnished with a number of cutting blades which sweep across a mouthpiece through which a "cheese," formed of compressed leaves, is fed. At times it is necessary to fit new blades to the head as they are continuously ground during the operation of the machine and become too short for further use. It will be appreciated that it takes a considerable time to put the blades in and feed them through the head by the slow automatic feed incorporated in these machines while the several edges are trimmed by grinding until they all rotate in the same plane which is virtually the plane of the mouthpiece. An object of the invention is to provide devices in a machine of this kind which will facilitate the replacement and initial grinding of the blades.

According to the invention there is provided in a machine of the kind referred to a gauge or stop surface against which the cutting edges of the freshly installed blades are located so that thereafter the head may be set in rotation and all the blades ground the necessary amount so that they are sharp and uniform and all the edges move in the same plane. The blades may be arranged for rapid advance through the head during the operation so that new blades which are only very roughly ground to an approximate shape by the makers may be rapidly ground to the proper shape. The blades may be separately adjustable so that each in turn may be fed up to the stop before the grinding operation commences. The gauge may be movable into and out of its operative position and may be adjustable for "height" that is for altering its distance from the plane of the mouthpiece. A convenient form of mounting consists in supporting the gauge on a resilient mounting and providing wedges, cams or the like for moving the gauge towards and away from the base of the mounting. The gauge may be connected to the mounting by bonded rubber or the like to provide said resilient mounting. The mechanism for moving the gauge to and from its operative position may comprise stops and if these are adjustable they furnish the means for adjusting the "height."

One way of carrying the invention into effect will be described with reference to the accompanying drawings in which:

Figure 3 is a section of Figure 2 partly on the line III—III and partly on the line 3—3.

Figure 4 is a section of Figure 2 on the line IV—IV.

Figure 5 is a section of Figure 1 on the line V—V, showing details of the blade holder and blade-feeding devices and drawn to a larger scale.

Figure 6 is a view looking in the direction of the arrow VI in Figure 1 and drawn to a larger scale.

Figure 7 is a diagram showing a blade cover plate in the open position.

Figure 8 is a section of the middle part of the cutting head showing the spindle and some of the blade-feeding mechanism.

Figure 9 is a partial end elevation of Figure 8.

Figure 1:
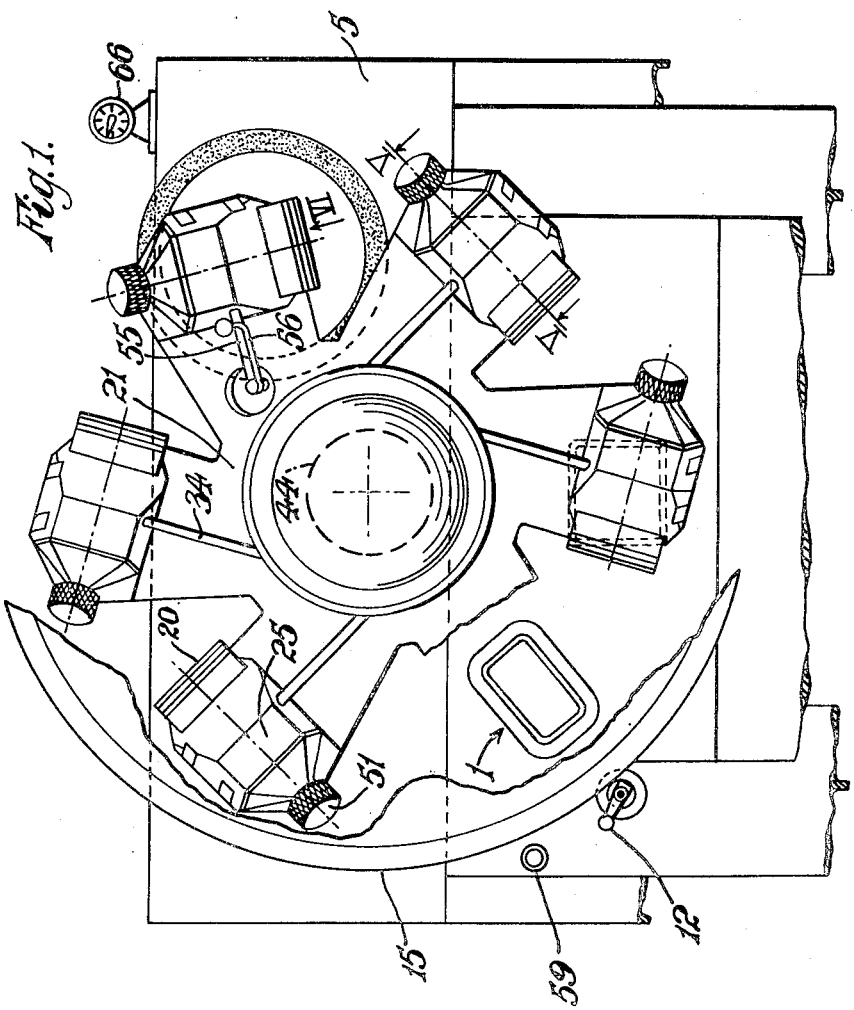
Figure 1 is a front elevation of the cutting head of a tobacco cutting machine partly broken away and showing also the neighbouring parts of the machine frame.

The machine partly illustrated in Figure 1 is of the kind described and illustrated in the copending United States application Serial No. 644,133 filed January 29, 1946, now Patent 2,535,692, granted December 26, 1950 where the blades are automatically fed during the operation of the machine so as to contact with the surface of a grinding wheel which keeps them sharp, the operative surface of the wheel determining the cutting plane which is virtually that of the mouthpiece.

Another typical tobacco cutting machine is described and illustrated in United States Patent No. 1,933,181 and reference to these two patents will fully explain the nature of such machines.

Figure 2:
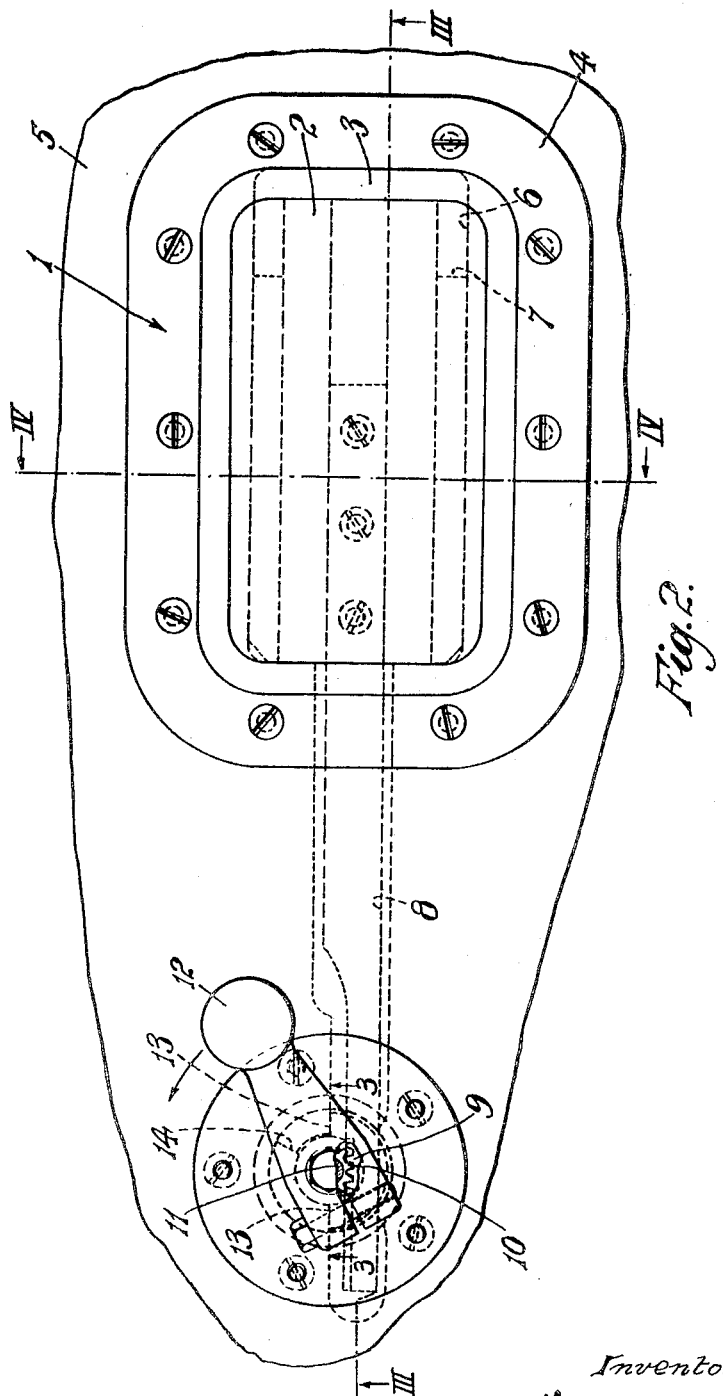
Figure 2 is an enlarged view of part of Figure 1 showing the gauge and its resilient mounting.

Referring to Figures 1, 2 and 3, at a suitable position on the frame 5 there is mounted a gauge generally indicated by the reference 1 which as seen better in Figure 2 consists of a flat piece of metal or other suitable material 2 with one surface thereof parallel to the cutting plane X—Y, Figure 3 of the machine. The gauge is substantially of rectangular shape and of sufficient area to enable a blade edge to lie on it. The flat piece 2 has rubber bonded to it all round its edges so as to form a rubber flange or "ring" 3 and the outer edge of the "ring" is bonded to a base plate 4 whereby the whole structure is bolted to the frame 5 of the machine. A wedge 6 is fixed to the back of the flat piece 2 and a co-operating wedge 7, slidably mounted in the base, is connected to a rod 8 so that endwise movements of the rod cause relative sliding of the wedges. The operative face of the gauge is moved to and from the face of the machine frame 5 on which the base is bolted, as shown in Figure 3, by the action of the wedges and the resiliency of the bonding.

The other end of the rod 8 comprises a rack 9, and a pinion 10 is provided which engages therewith so that rotation of the pinion moves the gauge towards and away from the said face. The pinion is mounted on a shaft 11 which has a handle 12 by which the pinion can be rotated and stops 13 are provided which engage a lug 14 on the handle 12 to limit the angular movement of the handle and thus the movement of the gauge. The handle is clamped on the shaft 11 so that it may be adjusted in order to vary the position of the rack rod at each end of the movement and thus the upper and lower positions of the part 2.

When new blades are put into the head they are manually fed forwards one at a time as described below until they touch the surface of the gauge which is advanced into its operative position by rotation of the handle 12.

In these machines the cutter head is entirely cased in when the machine is in motion and the casing or cover 15 Figure 1 is inter-locked with the driving mechanism (e. g. electrically) so that neither the head nor the grinding wheel can be started until the cover is closed.

Before the cover 15 is shut the handle 12 is rotated in the direction of the arrow, Figure 2, to remove the gauge from the path of the blades. The handle which operates the gauge is mechanically interlocked with the cover as shown in Figure 1 (i. e. it cannot be moved to its full extent before it contacts with the cover) so that the gauge cannot be moved into the path of the blades when the cover is shut. It may of course be electrically interlocked in any known manner. After the gauge is moved away from the blade path the cover is shut and the machine may be set into motion.

As will now be described the blades are fed automatically by a system of gearing and for manual feeding up to the gauge, a clutch or freewheel device is provided for each blade in the automatic feeding mechanism whereby the blades may be advanced with relation to the driving shaft of the machine.

Referring to Figures 5, 8 and 9 the blade 20 is clamped to the cutting head 21 by being gripped between a clamp 22 fixed to the head and a cooperating clamp 23 fixed to a clamp plate 24. The latter is attached to a cover plate 25 by screws 26 and springs 27 so that clamping takes place under strong spring pressure which holds the blade firmly but permits the blade to be fed outwards between the clamps.

A half-nut 28 engages a feed screw 29 and when the screw is rotated the nut moves along, being guided by flat surfaces 30 which form the upper surfaces of a guide block 31 which supports the feed screw. The screw has a buttress thread as shown in Figure 5 and the leading face is preferably undercut whereby the operative feeding movement of the screw tends to draw the nut into closer contact with the thread. The nut is shown at its lowest position in chain lines in the figure. A wormwheel 32 is supported at one end of the screw and driven by a worm 33 mounted on a shaft 34. The coupling between the wormwheel and screw is described later. The wormshaft is supported in a bearing 35 on the cutting head 21 and at its other end is provided with a ratched wheel 36, see Figure 9. The wheel is rotated by the movements of a pawl 37 pivoted at one end of an arm 38 of a double-armed lever which is pivoted in a fork at 39. The other arm 40 of the lever has a roller 41 at its end which engages with a collar 42 fixed to an end of a reciprocable rod 43 which extends through a hollow shaft 44 which constitutes the supporting and driving shaft for the cutting head. As will be seen from Figure 9 there are a series of such forks, levers and ratchets, one set for each blade of the cutting head. Springs 47 return the double armed levers each time the rod 43 is operated. The ratchet wheel 36 is operatively coupled to the wormshaft by a friction clutch comprising discs 45 and a spring 46 so that if the resistance of the blade to movement becomes excessive, generally because the nut has reached the end of its traverse, the clutch can slip and no harm is done to the mechanism. The rod 43 is caused to feed the blades by a cam lever 48 pivoted at 49 to the machine frame 5 and intermittently oscillated by a cam 50. The cam is fixed to a spindle 65 driven from the shaft 44 by the gearing shown in Figure 8 which includes a change gear at 60 which is carried by a quadrant 61 so that the blade feeding rate can be altered if desired. The last wheel of the gear train is marked 67 and is coupled to the cam shaft 65 as described later.

In order to permit each blade to be fed independently for feeding it up to the gauge or for any other purpose a hand knob 51 is fixed on the end of each screw. The knob has attached thereto a spiral spring 52. The spring closely embraces a sleeve 53 on which the wormwheel is fixed and when the wormwheel is rotated the spring winds up and grips the sleeve thereby transmitting the motion to the hand knob and thence to the screw. When however the knob is turned by hand to feed the blade forwards it is of course moved in the same direction and the spring slips on the wormwheel sleeve.

Figure 6 shows how the blade supporting structure is fixed on the cutting head 21. The cover plate 25 is hinged at 54 and a rod 55 projecting therefrom is held by a hand lever 56 pivoted to a link 57 which is pivoted in a fork member 58 screwed in a recess in the head 21. The operative end of the hand lever is eccentric and has a flat face which engages with a flat face of the rod 55 when the cover plate is in the closed position.

When the hand lever 56 is moved to release the rod the cover plate 25 may be swung over on its pivot to the position shown in Figure 7 to expose the blade for removal or inspection. A resilient stop 59 Figures 1 and 7, is provided, attached to the machine frame 5 against which the cover plate may strike without injury.

A further clutch or freewheel device is associated with the cam 50 and is therefore common to all the blades. The clutch is of a similar kind to that previously described for feeding each blade separately and comprises a spiral spring 62, Figure 8, embracing the boss 63 of the cam 50 and fixed to the boss of the cam gear wheel 67. A hand-wheel 64 is provided for turning the camshaft 65 and since this moves in the same direction as when under power the boss of the cam rotates freely within the spring. When the power drive is operating the spring winds up and grips the cam boss and the cam is rotated. The machine is started and the hand wheel 64 turned and all the blades are fed simultaneously and at a relatively rapid rate so that they may all be ground until their edges are in a plane. A final or fine grinding may then take place by allowing the blades to feed automatically before the machine starts to cut tobacco.

The ratio of the gearing for the independent manual feed (i. e. the knob 51) for each separate blade is preferably such that there is not much mechanical advantage and thus no particular skill is necessary to feed the blades up to the gauge. When a blade touches the gauge it is no longer possible to move the feeding knob or the like without undue effort.

On the other hand the manual device (i. e. the hand-wheel 64) for feeding all the blades at once has a large mechanical advantage so that even an unskilled person cannot feed the blades fast enough to damage them or the machine. The interlock between the handle 12 of the gauge and the cover renders it impossible to move the gauge while the machine is running and thus there is no danger of a moving blade striking the gauge.

A gauge may be provided on the machine to show how far a set of blades has been fed so that due warning is given of the need for replacement of the blades. This gauge is shown at 66 in Figure 1 and consists merely of a pointer moving over a dial the pointer being geared by a lengthy gear train which it is not necessary to illustrate, to the camshaft 65. In practice the reduction is 13,500 to 1.

What I claim as my invention and desire to secure by Letters Patent is:

1. A tobacco-cutting machine having a rotatable head and a plurality of cutting blades rotatable with the head, grinding means to grind each blade on rotation of the head, and automatic feeding means operable on rotation of the head to feed all the said blades forwardly at a slow rate, the machine comprising in combination, manually operable feeding means to feed an individual blade forwardly whereby freshly installed blades can be fed rapidly into position, a gauge having a stop surface against which the cutting edges of freshly installed blades are brought by said manual feeding means in order properly to locate all the blades before the latter are ground to proper and uniform shape by rotation of the head, means to move said gauge to an inoperative position away from the rotary path of said blades, said automatic feeding means comprising a clutch, independent feeding means for feeding all the blades simultaneously, during rotation of the head, at a faster rate than that at which they are fed by the automatic feeding means, and means operable by the independent feeding means to disengage said clutch whereby the independent feeding means overrides the automatic feeding means, whereby the blades can be rapidly ground to shape by feeding them at the faster rate and thereafter ground at a slow rate by the operation of said automatic feeding means.

2. A machine as claimed in claim 1 wherein the gauge is supported on a resilient mounting and cam means are provided for moving the gauge towards and away from the base of the mounting.

3. A machine as claimed in claim 2, wherein the gauge is connected to the mounting by bonded rubber to provide said resilient mounting.

GEORGE DEARSLEY.

REFERENCES CITED

The following references are of record in the file of this patent:

UNITED STATES PATENTS

| Number | Name | Date |
|---|---|---|
| 194,730 | Sangster | Aug. 28, 1877 |
| 501,779 | Ford | July 18, 1893 |
| 807,571 | Morterud | Dec. 19, 1905 |
| 1,933,181 | Molins et al. | Oct. 31, 1933 |
| 2,352,551 | Kende et al. | June 27, 1944 |
| 2,358,584 | Mizzy | Sept. 19, 1944 |

FOREIGN PATENTS

| Number | Country | Date |
|---|---|---|
| 297,066 | Great Britain | Sept. 14, 1928 |
| 526,902 | Great Britain | Sept. 27, 1940 |